United States Patent
Kim

(10) Patent No.: US 9,049,283 B1
(45) Date of Patent: Jun. 2, 2015

(54) CASE HAVING A STORAGE COMPARTMENT FOR ELECTRONIC DEVICES

(71) Applicant: Dae-Young Kim, Seoul (KR)

(72) Inventor: Dae-Young Kim, Seoul (KR)

(73) Assignee: SPIGEN KOREA CO., LTD., Geumcheon-Gu, Seoul (KR)

(*) Notice: Subject to any disclaimer, the term of this patent is extended or adjusted under 35 U.S.C. 154(b) by 0 days.

(21) Appl. No.: 14/562,621

(22) Filed: Dec. 5, 2014

Related U.S. Application Data

(60) Provisional application No. 62/012,962, filed on Jun. 16, 2014.

(51) Int. Cl.
| | |
|---|---|
| A45C 15/00 | (2006.01) |
| B65D 85/00 | (2006.01) |
| H04M 1/21 | (2006.01) |
| A45C 13/02 | (2006.01) |
| G06F 1/16 | (2006.01) |

(52) U.S. Cl.
CPC ............... H04M 1/21 (2013.01); H04B 1/3888 (2013.01); *A45C 2013/025* (2013.01); *G06F 1/1628* (2013.01)

(58) Field of Classification Search
CPC ............ A45C 2013/025; G06F 1/1628; G06F 1/1624
USPC ............ 206/37–39, 305, 320, 449, 468, 576; 361/679.01, 679.3, 679.55, 679.56; 455/575.1, 575.8
See application file for complete search history.

(56) References Cited

U.S. PATENT DOCUMENTS

| | | | |
|---|---|---|---|
| 8,047,364 B2* | 11/2011 | Longinotti-Buitoni | 206/320 |
| 8,439,191 B1* | 5/2013 | Lu | 206/320 |
| 8,833,379 B1* | 9/2014 | Kaplan | 206/320 |
| 2010/0230301 A1* | 9/2010 | Fellig | 206/232 |
| 2011/0294556 A1* | 12/2011 | Carlberg et al. | 455/575.8 |
| 2012/0021810 A1* | 1/2012 | Terry | 455/575.8 |
| 2012/0067751 A1* | 3/2012 | Mongan et al. | 206/216 |
| 2012/0244918 A1* | 9/2012 | Hall | 455/575.4 |
| 2013/0095898 A1* | 4/2013 | Altschul et al. | 455/575.8 |
| 2013/0157730 A1* | 6/2013 | McCormac et al. | 455/575.8 |
| 2014/0034531 A1* | 2/2014 | Wang | 206/320 |
| 2014/0051488 A1* | 2/2014 | Chung | 455/575.8 |
| 2014/0066142 A1* | 3/2014 | Gipson | 455/575.8 |

* cited by examiner

*Primary Examiner* — Luan K Bui
(74) *Attorney, Agent, or Firm* — East West Law Group; Heedong Chae

(57) ABSTRACT

A case, having a storage compartment, for an electronic device includes a soft protective case that protects the electronic device installed therein; a hard protective frame, configured to removably mount over the soft protective case wherein the hard protective frame comprises grooves; and a cover which has rails adapted to mate with and slidably mounted on the grooves so that the cover slides along the grooves to open and close the storage compartment.

22 Claims, 16 Drawing Sheets

US 9,049,283 B1

CASE HAVING A STORAGE COMPARTMENT FOR ELECTRONIC DEVICES

CROSS-REFERENCE TO RELATED APPLICATIONS

This application claims priority to U.S. provisional patent application No. 62/012,962 filed Jun. 16, 2014, which is incorporated herein by reference in its entirety.

FIELD OF THE INVENTION

The present invention relates to a case having, a storage compartment, for an electronic device and, more particularly, to a mobile phone case having three main members of a soft protective case, a hard protective frame and a cover. The cover is configured to slidably open and close the storage compartment which stores personal items such as a credit card.

BACKGROUND OF THE INVENTION

Portable electronic devices, such as mobile phones, smart phones, tablet computers and the like, have become popular and widely used for communication, entertainment purposes and other purposes. These electronic devices are intended to be carried or moved about and as such, these devices are more likely to be accidentally dropped, hit, or scratched. To protect the portable electronic devices, protective cases have been introduced and become popular in connection with the electronic devices such as cell phones, smart phones, tablet computers and the like.

There has been a trend towards combining several functions into the protective cases, for example, a case having a pocket or purse clutter integrated therein. Among many types of cases, flip/folio-style cases have become popular to have a storage space to store credit/debit cards. A cover flip opens and closes over an electronic device such as a mobile phone or a smart phone. Such cover usually has a securing mechanism such as a snap, a magnet, or hook and loop fasteners. Credit cards are usually stored inside the front cover of the case. In order to use the electronic device, the cover must be opened, thereby exposing the front of the device and the credit cards together. Thus, whenever a user uses the electronic device, the credit cards are exposed as well.

Besides, the sizes and shapes of modern cell phones have become much more compact than those in the past, and accordingly, the cases have become compact as well. Thus, adding a storage space for personal items such as a credit card tends to make the cases unnecessarily bulkier and heavier.

Therefore, to solve the above problems and facilitate convenient carrying of personal items such as credit/debit cards, there is a need for a case for an electronic device having a compact, stylish and integrated structure for a storage compartment to store personal items such as a credit/debit card(s). This invention is directed to solve these problems and satisfy the long-felt need.

SUMMARY OF THE INVENTION

The present invention contrives to solve the disadvantages of the prior art. The present invention provides a case, having a storage compartment, for an electronic device and, more particularly, to a mobile phone case having three main members of a soft protective case, a hard protective frame and a cover. The cover is configured to slidably open and close the storage compartment which stores a credit card.

The object of the invention is to provide a case, having a storage compartment, for an electronic device which includes a soft protective case, a hard protective frame, and a cover. The cover slides forward and backward with respect to the hard protective frame to open and close the storage compartment formed by the soft protective case and the cover.

Another object of the invention is to provide a case, having a storage compartment, for an electronic device which includes a soft protective case, a hard protective frame, and a cover. A raised wall is formed on a bottom surface of the soft protective case to form a storage compartment and the hard protective frame has an aperture to surround the raised wall. The hard protective frame and the cover respectively have grooves and rails and the rails slide forward and backward with respect to the grooves to open and close the cover.

Still another object of the invention is to provide a case, having a storage compartment, for an electronic device which includes a soft protective case, a hard protective frame, and a cover. The hard protective frame is provided with an indentation structure and the cover is constructed to form a complementary structure to be received in the indentation structure of the hard protective case. In addition, the hard protective frame has a protuberance on an opposite side of the indentation structure of the hard protective frame to structurally support and reinforce the indentation structure of the hard protective frame. The soft protective case has a complementary structure of an indentation to receive the protuberance of the hard protective frame.

The advantages of the present invention are: (1) the case having a storage compartment of the present invention well protects an item such as a credit card stored in the storage compartment; (2) the case of the present invention has one compact, stylish, and integrated structure; and (3) the credit card is not easily visible to others.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
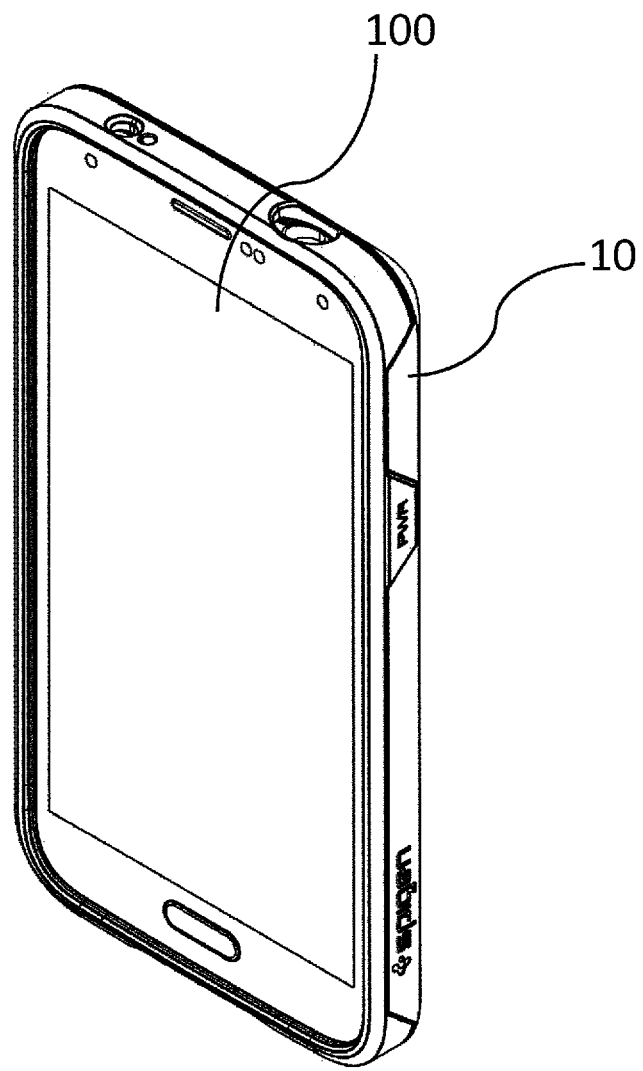
FIG. 1 shows a perspective view of a case with an electronic device installed therein according to one embodiment of the present invention.
Figure 2:
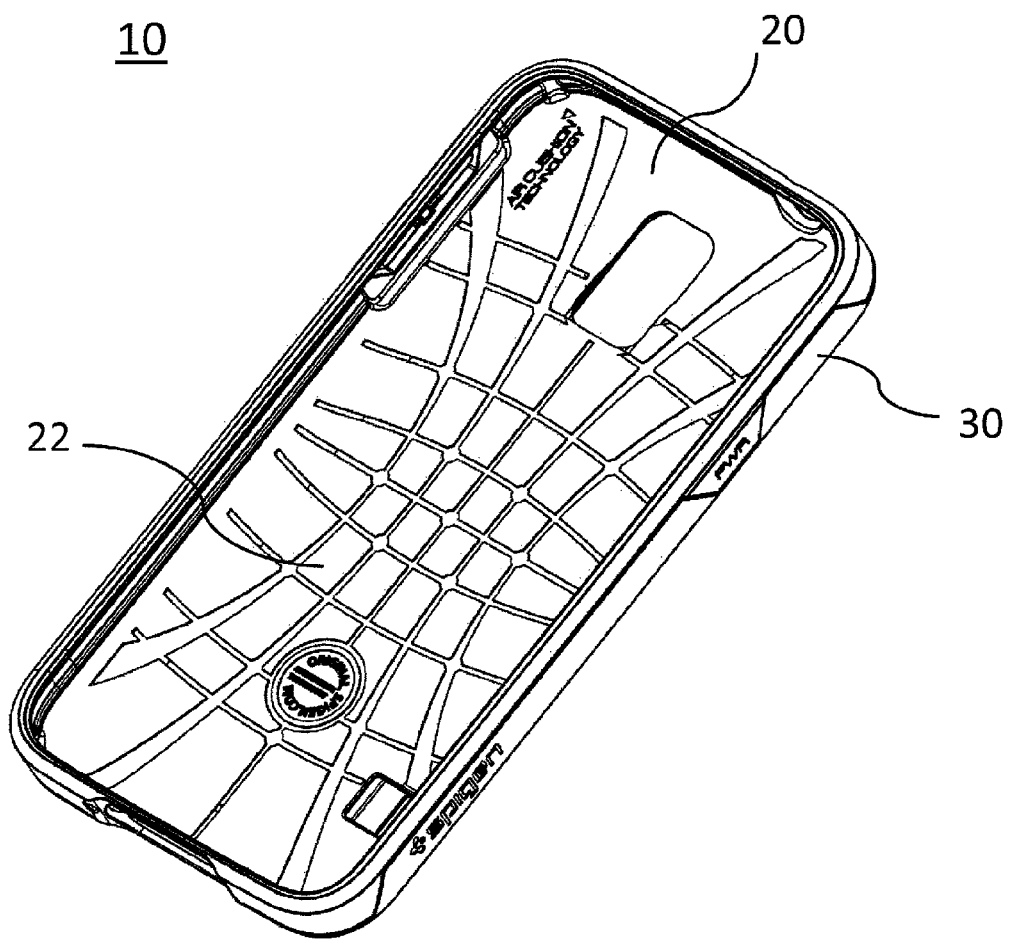
FIG. 2 shows a perspective view of the case according to the present invention.
Figure 3:
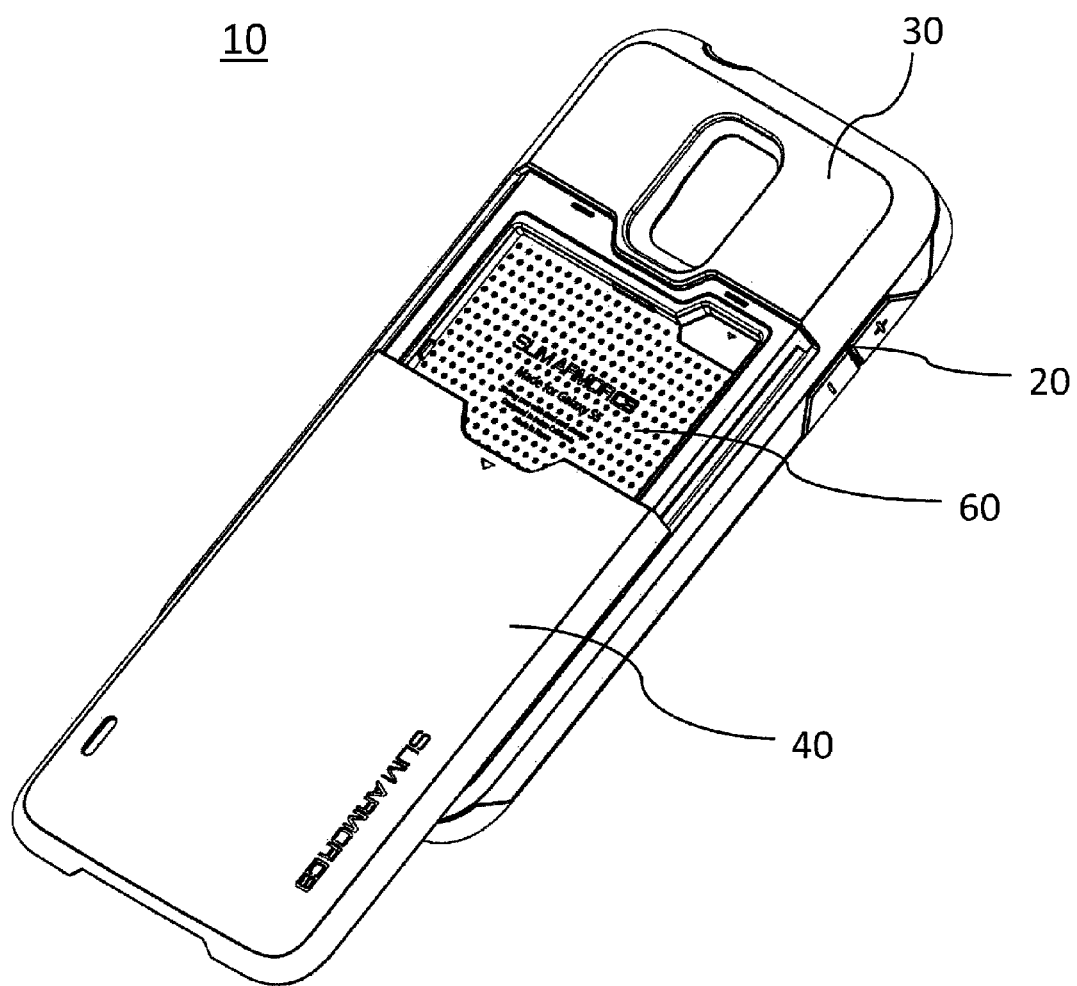
FIG. 3 shows another perspective view of the case with the cover slidably open according to the present invention.

FIGS. 1, 2 and 3 show perspective views of the case for an electronic device 100 according to the present invention. The electronic device 100 may be a mobile phone, a cell phone, PDA, a smart phone, etc.

The case 10 of the present invention, having a storage compartment 60, for an electronic device 100, includes a soft protective case 20 to cover the electronic device 100 installed therein; a hard protective frame 30, configured to removably mount over the soft protective case 20; and a cover 40. The soft protective case 20 includes a back panel 21 to cover a back portion 110 of the electronic device 100, and the back panel 21 includes a top surface 22 and a bottom surface 23 such that the top surface 22 faces the electronic device 100. In addition, the soft protective case 20 further includes a raised wall 50 formed on a bottom surface 23 of the back panel 21 to form a storage compartment 60, and a side wall 25 extending from a top surface 22 of the back panel 21 along edges of the back panel 21.

The hard protective frame 30 is constructed to removably mount over the soft protective case 20 and includes grooves 70. The cover 40 includes rails 80 adapted to mate with and to be slidably mounted on the grooves 70 so that the cover 40 slides along the grooves 70 to open and close the storage compartment 60. The grooves 70 may be formed vertically as in FIG. 3, or alternatively, they 70 may be formed horizontally.

The soft protective case 20 significantly covers a back portion 110 of the electronic device 100 with the top surface 22 of the back panel 21 and a side portion 120 of the electronic device 100 with the side wall 25 of the soft protective case 20. In addition, the soft protective case 20 is sufficiently flexible to accept insertion of the electronic device 100 therein and sufficiently rigid to securely retain the inserted electronic device 100. The soft protective case 20 significantly covers a back portion 110 and a side portion 120 of the electronic device 100.

Items that can be stored in the storage compartment 60 include credit cards, payment cards, identification cards (e.g., driver's license, membership card, etc.), business cards, coupons, receipts, gift cards, and the like.

The hard protective frame 30 further includes an aperture 32 to surround the raised wall 50 of the soft protective case 20. Preferably, the aperture 32 snuggly fits with an outer side 52 of the raised wall 50 of the soft protective case 20.

Figure 4:
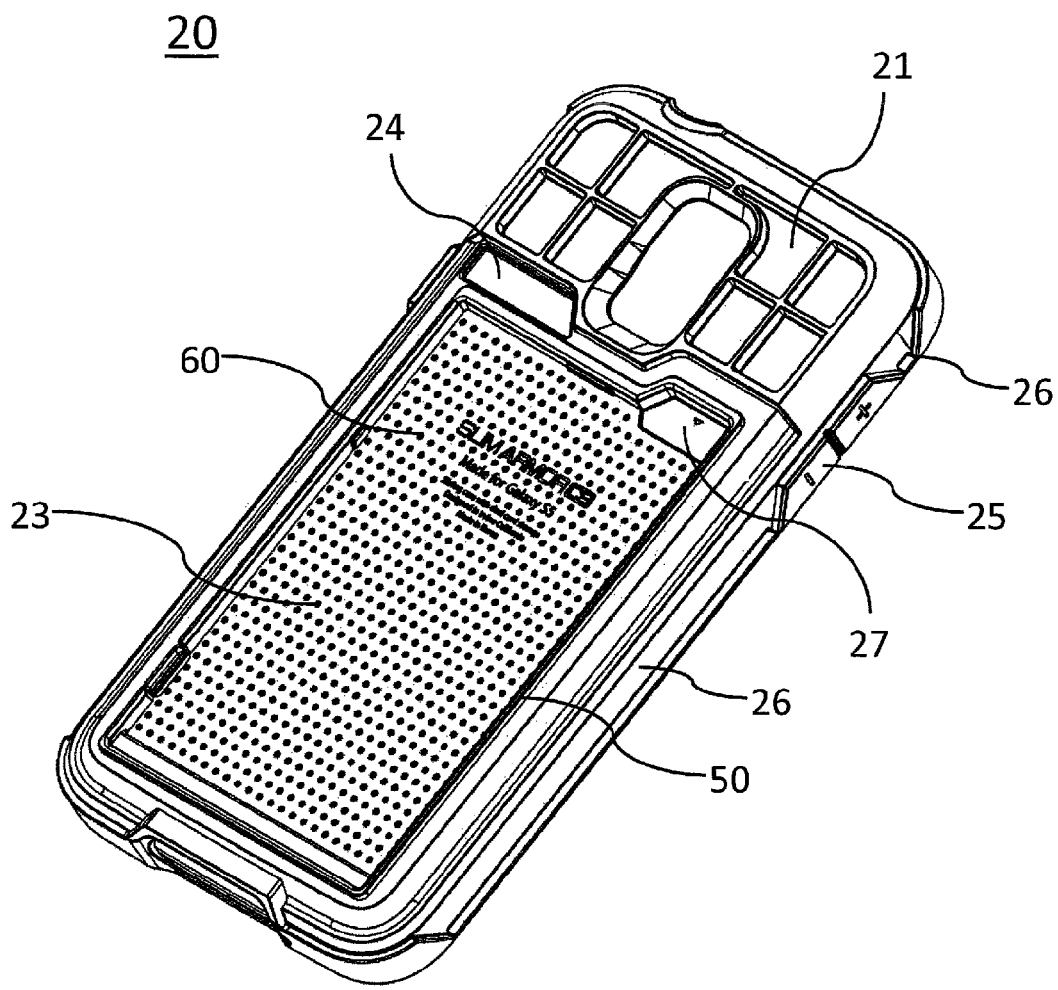
FIG. 4 shows a perspective view of the soft protective case of the present invention.
Figure 5A:
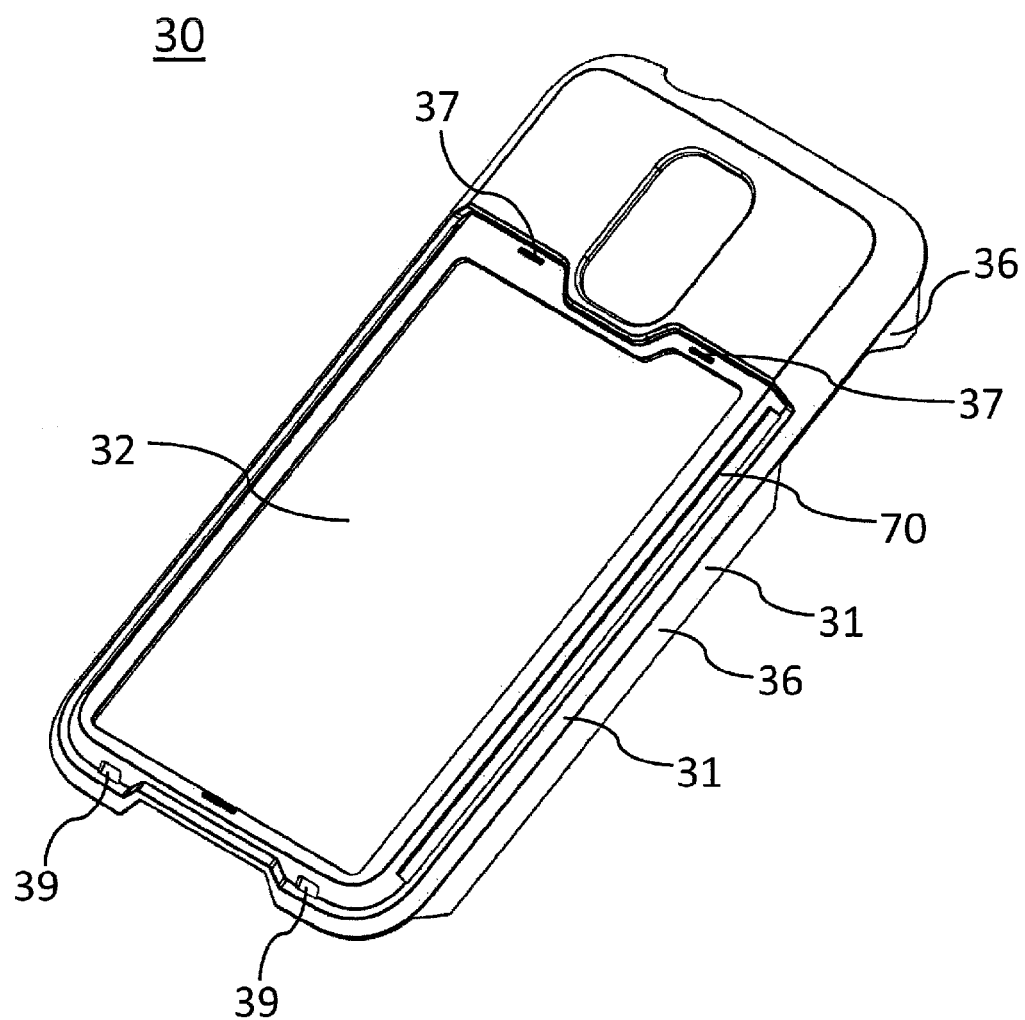
FIGS. 5A and 5B show a perspective view of the hard protective frame of the present invention.
Figure 5B:
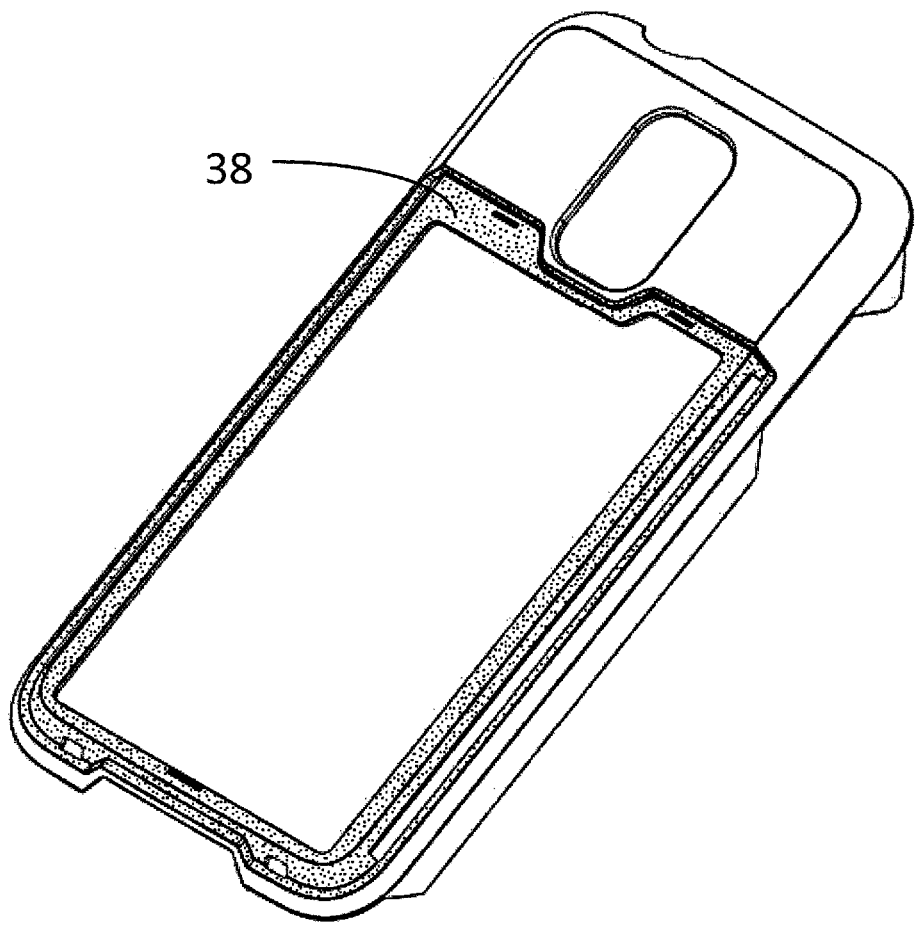

FIGS. 4 and 5A and 5B respectively show perspective views of the soft protective case 20 and the hard protective frame 30.

The soft protective case 20 is provided with a plurality of indentations 26 and the hard protective frame 30 has complementary structures 36 received in the indentations 26. The indentations 26 are provided on the side wall 25 of the soft protective case 20 as shown in FIG. 4. Lower side of the indentations 26 is provided with a long recess and the complementary structures 36 is provided with a corresponding long protrusion so that the the long protrusion is received in the long recess for secure and tight coupling of the soft protective case 20 and the hard protective frame 30.

Figure 6:
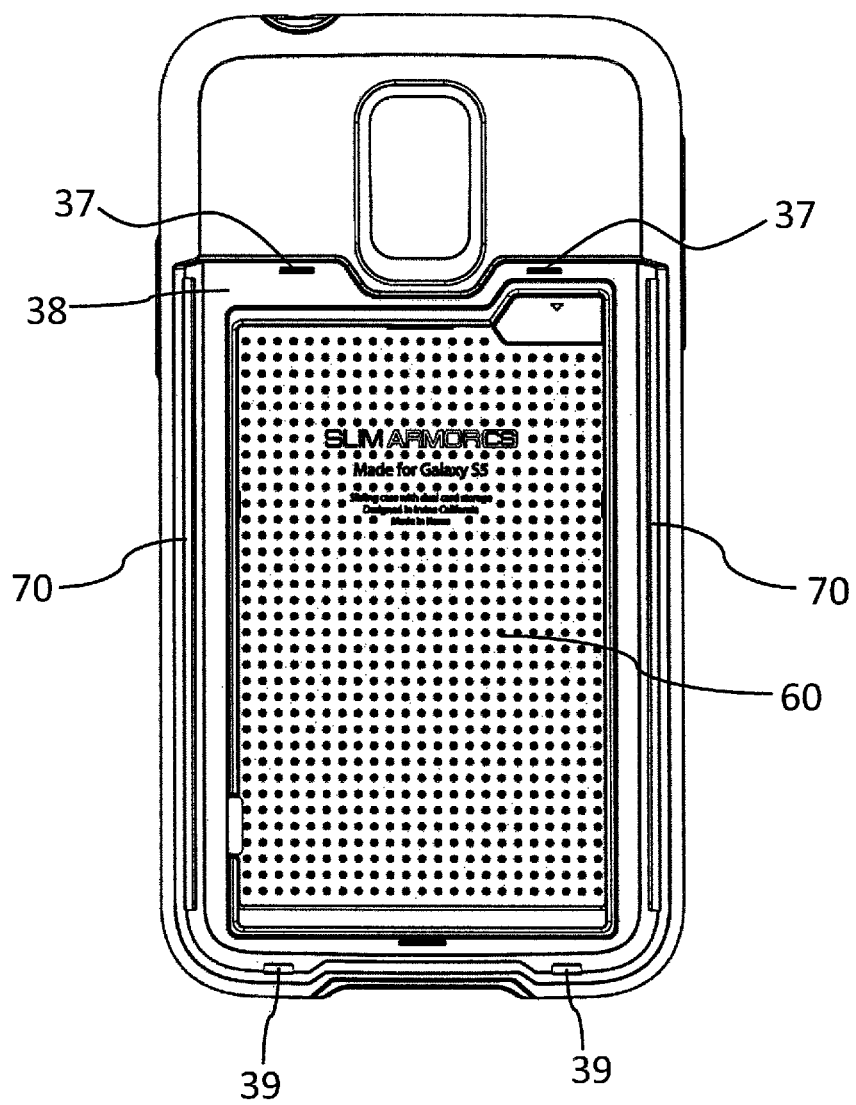
FIG. 6 shows a top view of the hard protective frame mounted on the soft protective case according to the present invention.

The hard protective frame 30 is provided with an indentation structure 38 and the cover 40 has a complementary structure 48 received in the indentation structure 38 of the hard protective case 30. As shown in FIGS. 5 and 6, the indentation structure 38 of the hard protective frame is constructed along the boundary of the aperture 32 and the indentation structure 38 receives the cover 40. The cover as a whole is configured to form the complementary structure 48. Accordingly, the cover 40 looks like a cut-out from the hard protective frame 30.

Figure 8A:
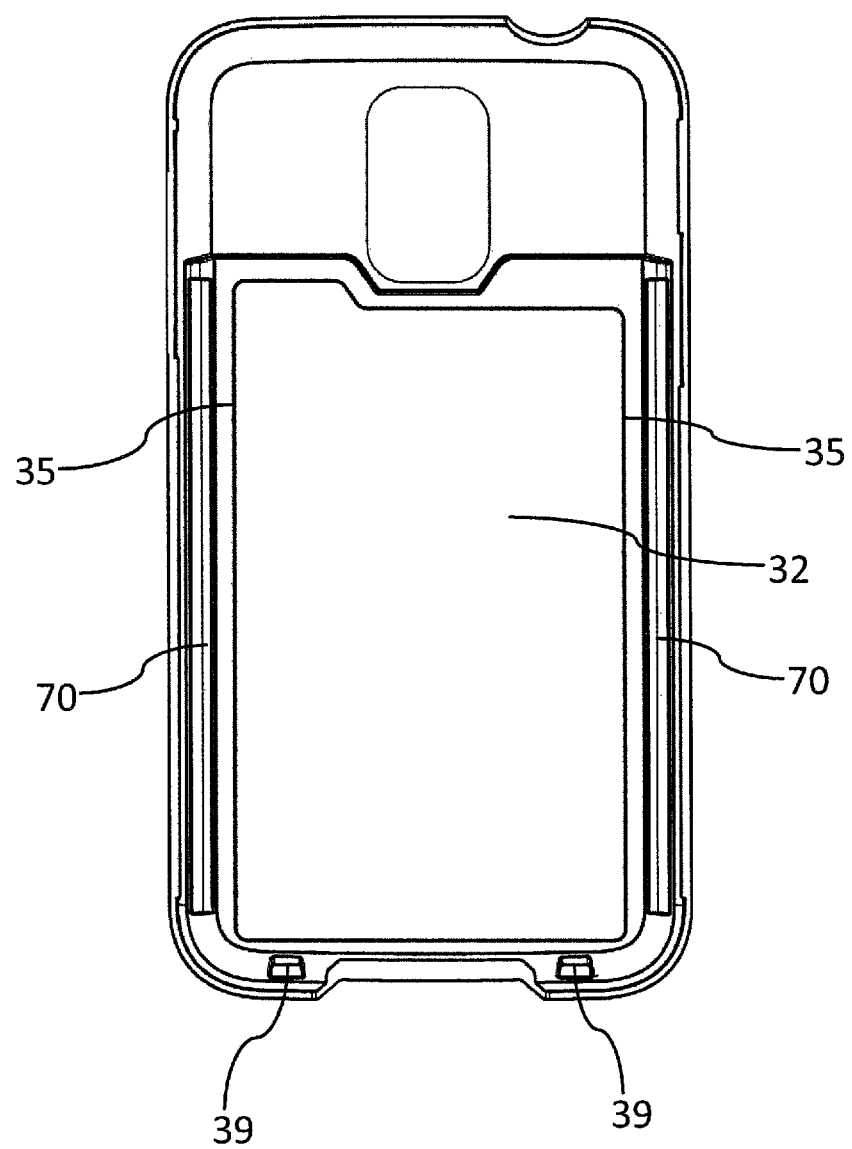
FIGS. 8A and 8B show a bottom view of the hard protective frame of the present invention.
Figure 8B:
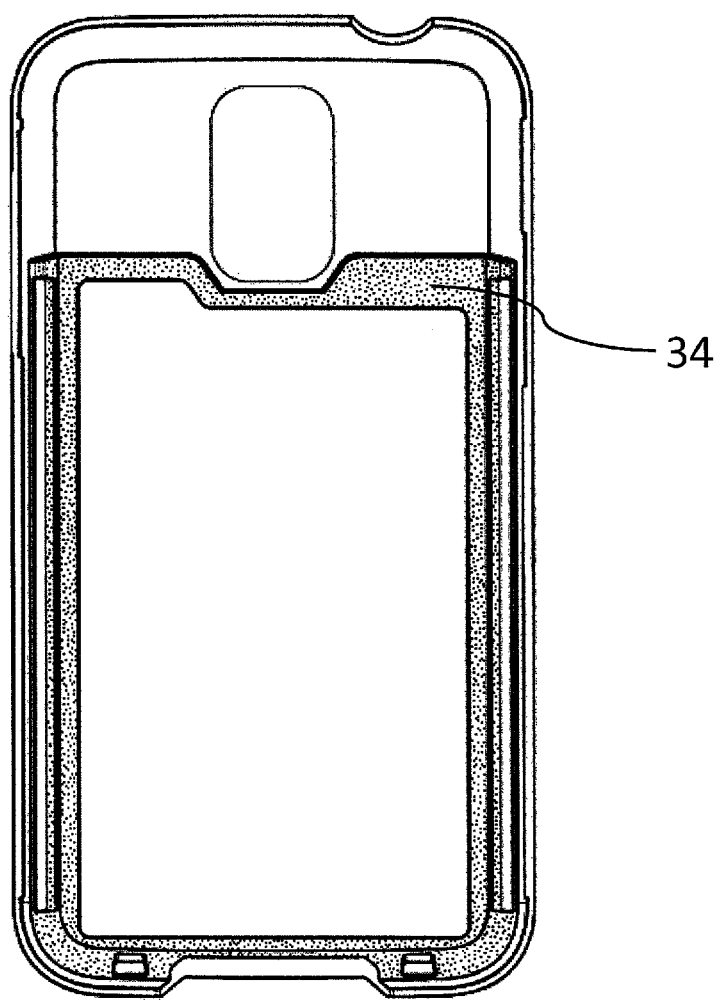

FIGS. 8A and 8B show a bottom view of the hard protective frame 30.

The hard protective frame 30 has a protuberance 34 on an opposite side of the indentation structure 38 of the hard protective frame 30 to structurally support and reinforce the indentation structure 38 of the hard protective frame 30, and the soft protective case 20 has a complementary structure of an indentation 24 to receive the protuberance 34 of the hard protective frame 30. FIG. 7B shows the indentation 24 in a shade and FIG. 8B shows the protuberance 34 in a shade formed along the boundary of the aperture 32. The complementary structure 24 of the soft protective cover 20 is constructed along the raised wall 50.

Because of the indentations, protuberance and complementary structures of the soft protective cover 20, the hard protective frame 30, and the cover 40, the case 10 has a compact and integrated structure.

Figure 7A:
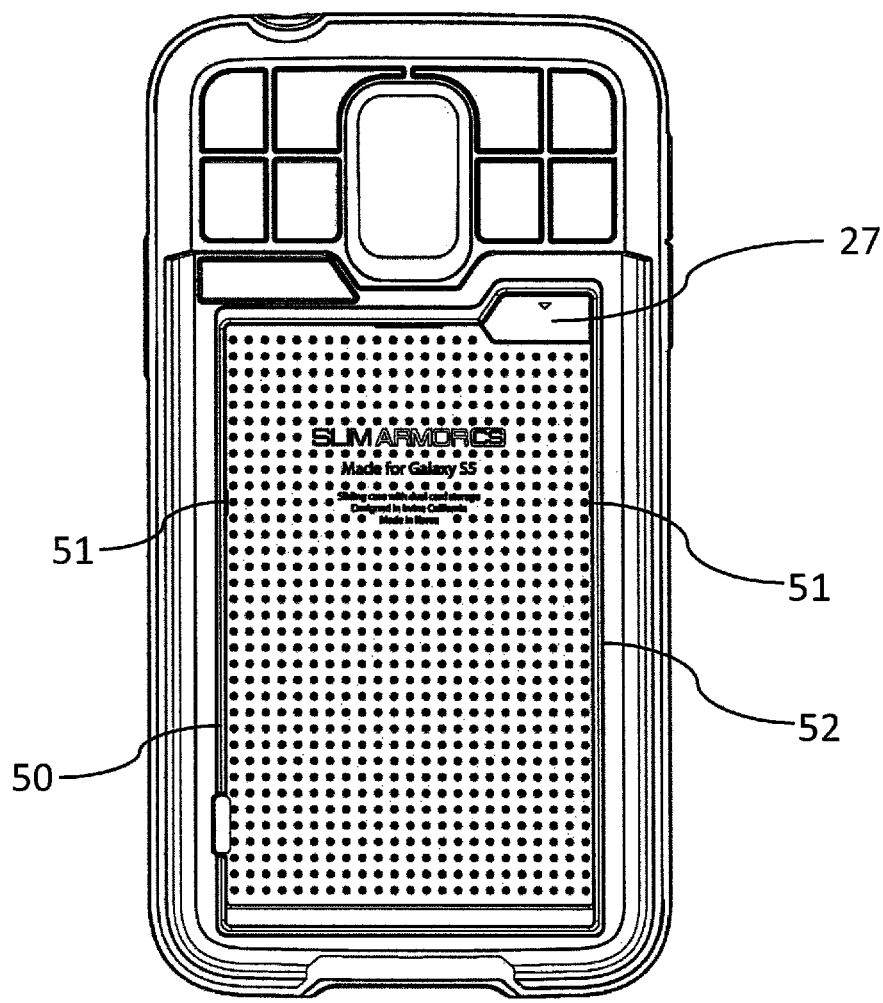
FIGS. 7A and 7B show a top view of the soft protective case according to the present invention.
Figure 7B:
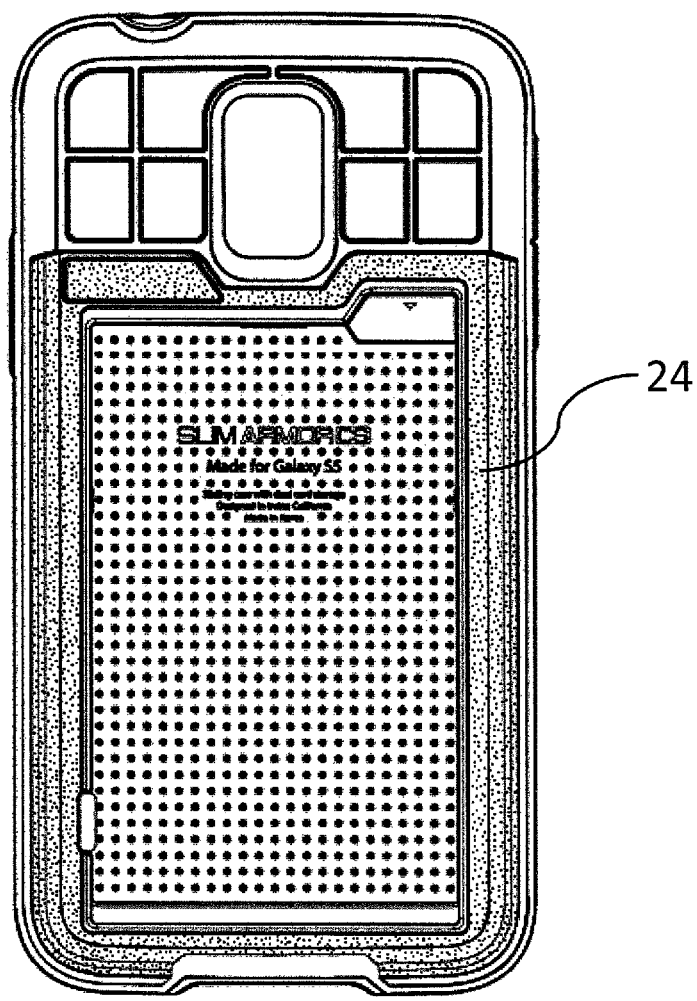

FIGS. 6 and 7A respectively show top views of the soft protective case 20 and the hard protective frame 30 such that the hard protective frame 30 is mounted on the soft protective case 20.

The number of the grooves 70 is preferably two and the grooves are formed on opposite side walls 31 of the hard protective frame 30. The number of the rails 80 is two as well and the rails 80 are formed on opposite side walls 41 of the cover 40.

Figure 11:
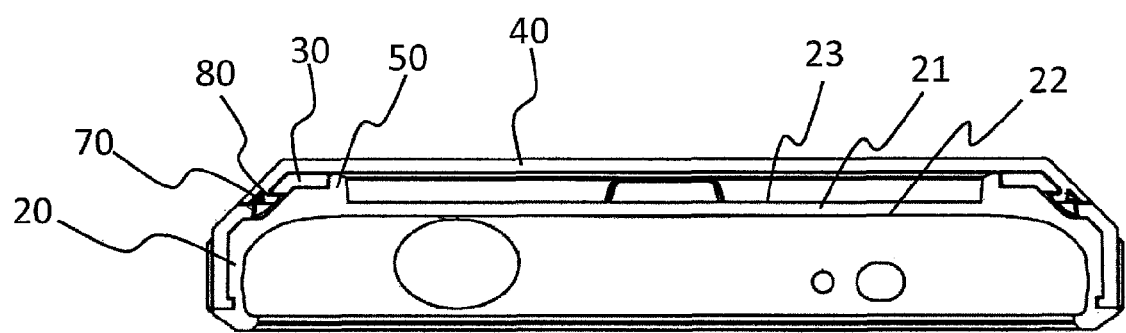
FIG. 11 shows a cross-sectional view of the present invention.
Figure 12A:
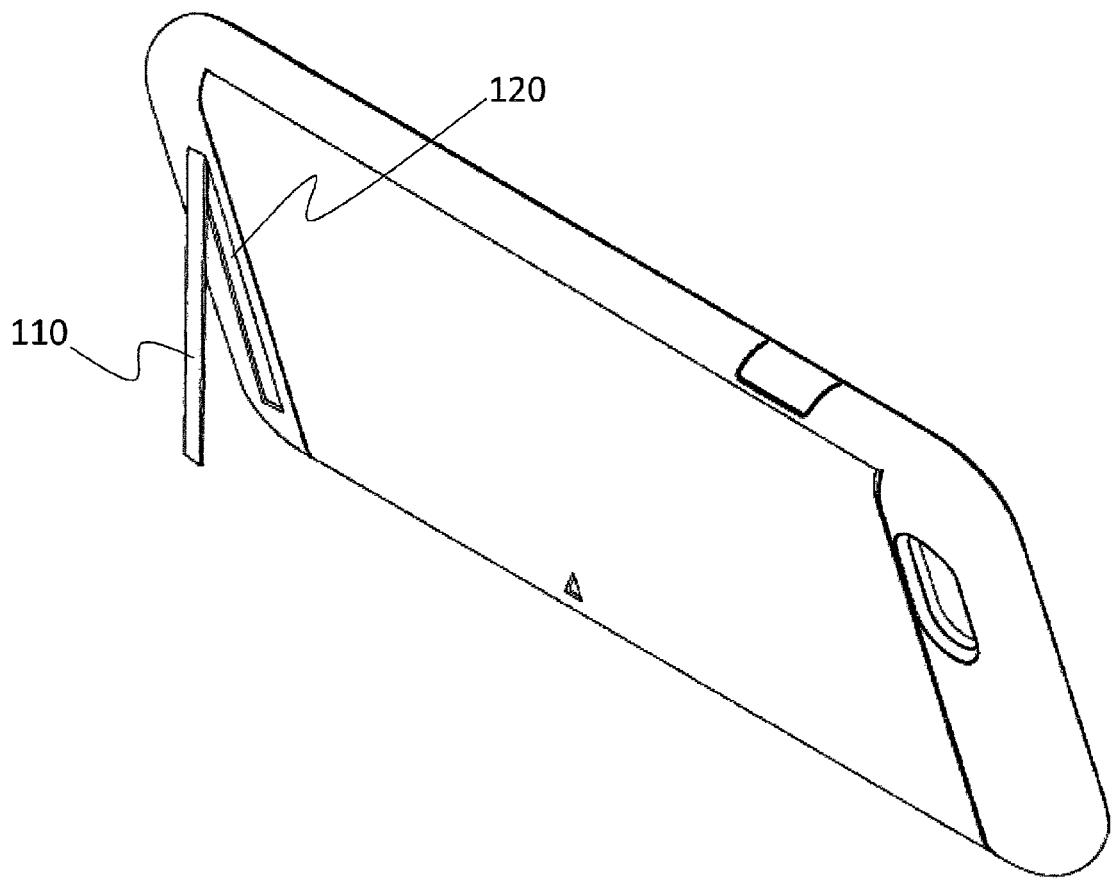
FIG. 12A shows a perspective view of the case having a standing leg according to the present invention.
Figure 12B:
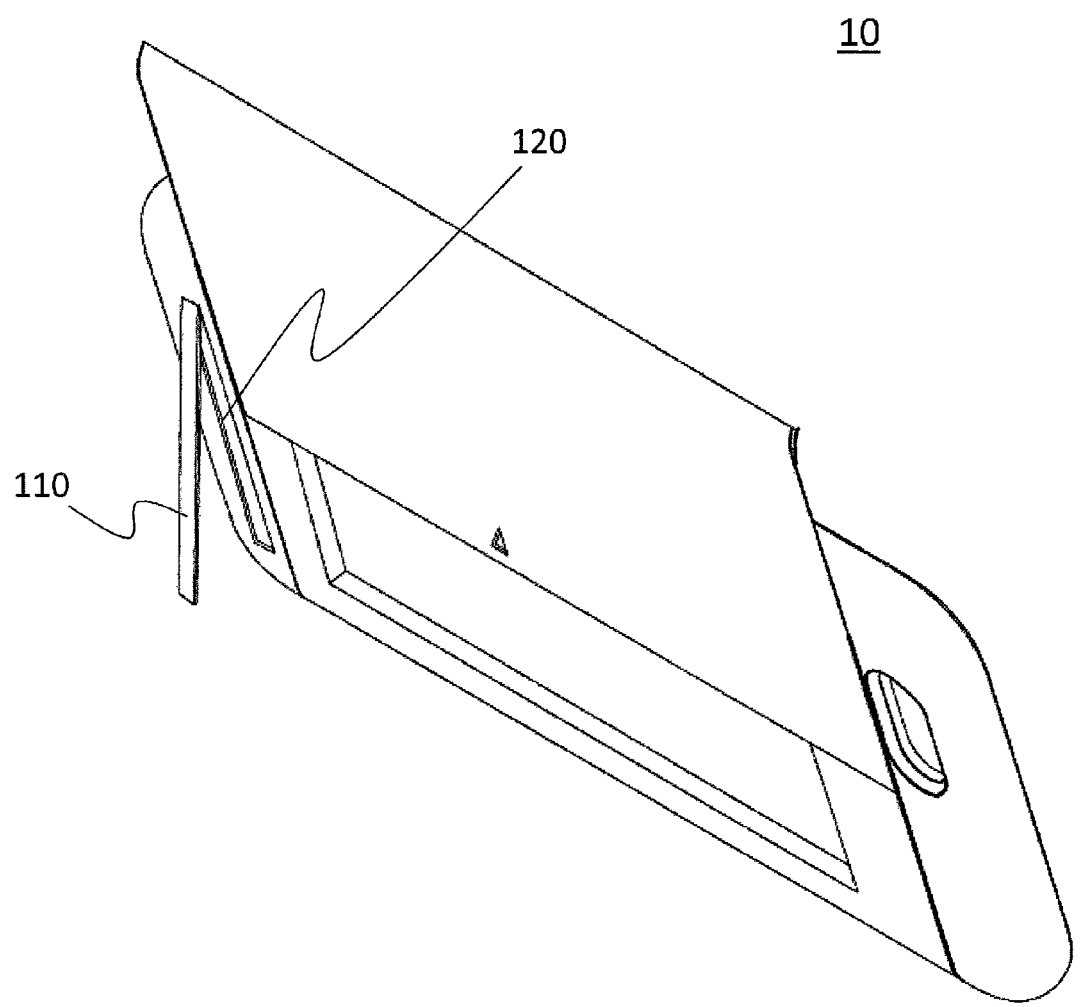
FIG. 12B shows another perspective view of the case having a standing leg of FIG. 12A when the cover is slide open.

The side walls 31 and 41 of the hard protective frame 30 and the cover 40 are preferably slanted as shown in FIGS. 3 and 11. Because of this slanted side walls, the cover 40 is not dislodged from the hard protective frame 30 and can slide forward and backward with respect to the hard protective frame 30. The rails 80 of the cover 40 are received in the grooves 70 of the hard protective frame 30. The rails 80 face toward each other as shown in FIG. 11, locking the cover 40 onto the hard protective frame 30, and thus, the case 40 can slide forward and backward with respect to the hard protective frame 30 without being dislodged. The case 40 may slide up and down the hard protective frame 30, or alternatively, the case 40 may slide to the right and the left with respect to the hard protective frame 30 as shown in FIGS. 12A and 12B.

The width and length of the storage compartment 60 is respectively slightly greater than those of a credit card 90 so that a credit card can be snugly inserted therein and elastic tabs 51 are formed on opposite sides of the raised wall 50 of the soft protective case 20 for securely holding the credit card 90.

As shown in FIG. 4, the raised wall 50 of the soft protective case 20 is enclosed to form and define the storage compartment 60.

The bottom surface 23 of the soft protective case 20 may further include a depression 27 for easy access to a credit card 90 stored in the storage compartment 60. The depression 27 may be located in the middle or on the side as shown in FIG. 7A. Because of the depression 27, a user can put his finger in the depression 27 and lift an upper side of the credit card to pick it up from the storage compartment 60.

Figure 9:
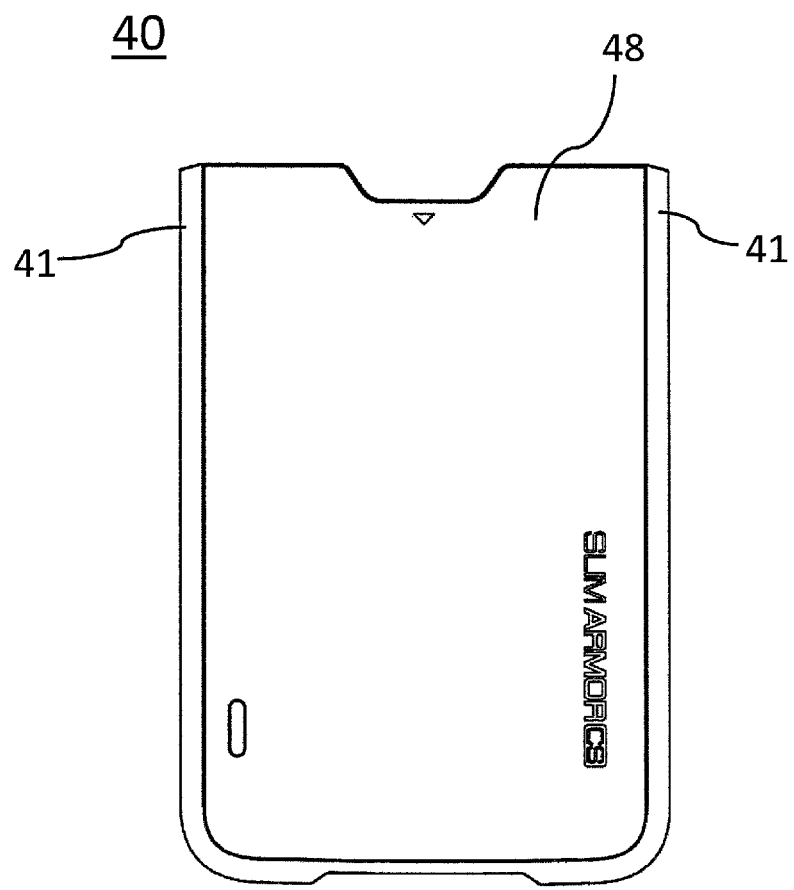
FIG. 9 shows a top view of the cover of the present invention.
Figure 10:
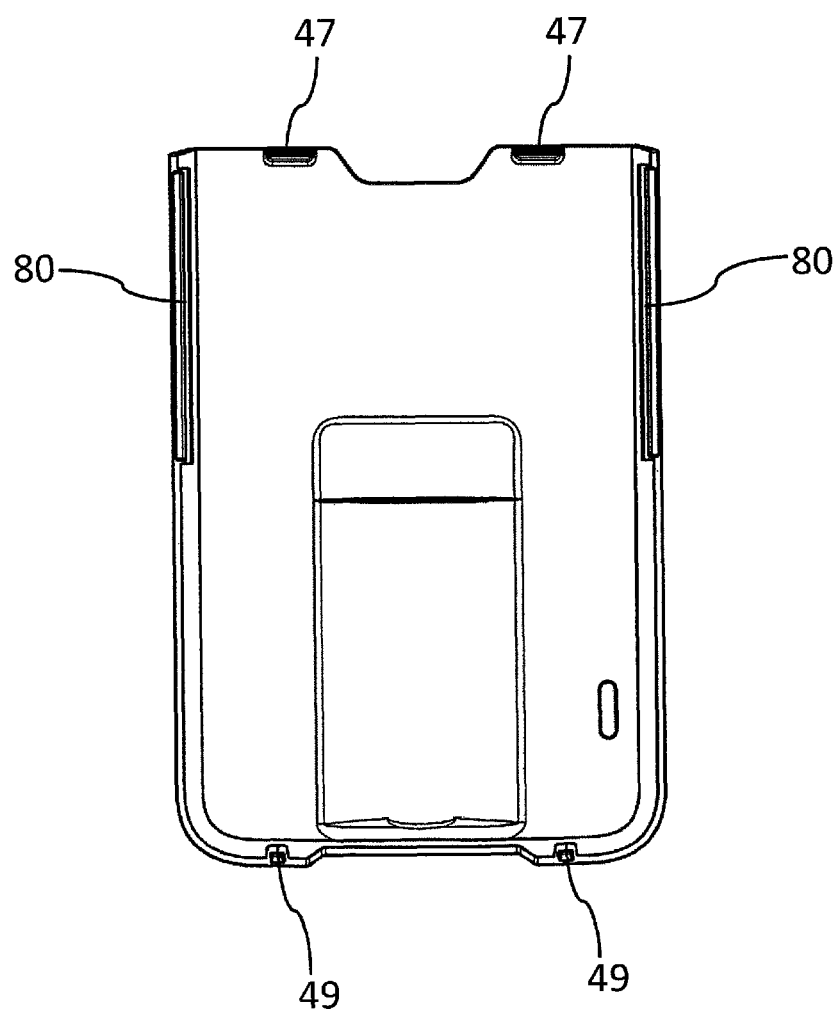
FIG. 10 shows a bottom view of the cover of the present invention.

FIGS. 9 and 10 respectively show a top view and bottom view of the cover 40. The hard protective frame 30 may further include a locking protrusion 37 and the cover 40 may further include a locking recess 47 positioned to mate with the corresponding locking protrusion 37.

Alternatively, the hard protective frame 30 may have a locking recess 47 and the cover 40 may have a locking protrusion 37. To close the storage compartment 60, a user slides up the cover 40 onto the hard protective frame 30 until the locking protrusion 37 mates or locks with the locking recess 47. Sliding down the cover will dislodge the locking protrusion 37 from the locking recess 47.

The hard protective frame 30 may further comprise a cavity 39 and the cover 40 may further comprise a mating protrusion 49 positioned to mate with the cavity 39 of the hard protective frame 30. Alternatively, the hard protective frame 30 may have a mating protrusion 49 and the cover may have a cavity 39. Mating and interlocking of the mating protrusion 49 and the cavity 39 prevents dislodging of the cover 40 from the hard protective frame 30.

Preferably, the hard protective frame 30 and the cover 40 have three types of locking mechanisms: the grooves 70 and the rails 80 on opposite sides, the locking protrusion 37 and the locking recess 47 on the top, and the cavity 39 and the mating protrusion 49 on the bottom. Because of these locking mechanisms, the cover 40 can securely close the storage compartment 60 and slide forward and backward with respect to the hard protective frame 30 without being dislodged.

The soft protective cover 20 may be made of any soft material to protect a mobile phone and a credit card therein, preferably thermoplastic polyurethane, and the hard protective frame 30 and the cover 40 may be made of hard material, preferably polycarbonate.

Due to the soft material of the soft protective cover 20, it may be sufficient to hold in place a credit card within the storage compartment 60. The bottom surface 23 of the soft protective case 20 may further comprise a plurality of recesses 29 to hold the credit card in place.

FIG. 11 shows a cross-sectional view of the present invention. A longitudinal recess 55 may be formed on the bottom surface 23 of the soft protective case 20 along the outer side 52 of the raised wall 50 of the soft protective case 20, and a longitudinal protrusion 35 may be formed on the hard protective frame 30 along a boundary of the aperture 32. The longitudinal protrusion 35 of the hard protective frame 30 may snugly fit into and be received by the longitudinal recess 55 of the soft protective case 20.

In the alternative embodiment of the present invention, the case 10, having a storage compartment 60, for an electronic device 100, may include a soft protective case 20 which comprises a back panel 21 to cover a back portion 110 of the electronic device 100, and a side wall 25 extending from a top surface 22 of the back panel 21 along edges of the back panel 21; a hard protective frame 30, configured to removably mount over the soft protective case 20, wherein the hard protective frame 30 comprises an aperture 32 to form a storage compartment 60; a cover 40 to slide forward and backward with respect to the hard protective frame 30 for opening and closing the storage compartment 60 formed on a bottom surface 23 of the soft protective case 20; and a sliding means 92 for sliding the cover 40 forward and backward with respect to the hard protective frame 30.

The sliding means 92 may include a pair of grooves 70 formed on the hard protective frame 30 and a pair of rails 80 formed on the cover 40 such that the rails 80 are configured to mate with and to be slidably mounted on the grooves 70. A raised wall 50 may be formed on a bottom surface 23 of the soft protective case 20 to form the storage compartment 60 and the aperture 32 of the hard protective frame 30 surrounds the raised wall 50 of the soft protective case 20. Preferably, the aperture 32 snugly fits with the outer side 52 of the raised wall 50.

The soft protective case 20 is provided with a plurality of indentations 26 and the hard protective frame 30 has complementary structures 36 to be received in the indentations 26. Furthermore, the hard protective frame 30 is provided with an indentation structure 38 and the cover 40 has a complementary structure 48 received in the indentation structure 38 of the hard protective case 30. FIG. 5B shows the indentation structure 38 in a shade. The hard protective frame 30 has a protuberance 34 on an opposite side of the indentation structure 38 of the hard protective frame 30 to structurally support and reinforce the indentation structure 38 of the hard protective frame 30, and the soft protective case 20 has a complementary structure of an indentation 24 to receive the protuberance 34 of the hard protective frame 30.

FIGS. 12A and 12B show perspective views of the case having a standing leg according to the present invention.

The case 10 further comprises a standing leg 110 which fits in an opening 120 formed on a back portion of the hard protective frame 30 wherein the standing leg 110 is pivoted with the opening 120. Thus, the standing leg 110 can be rotated to support the case 10, and when the standing leg 110 is not used, it can be rotated back in the opening 120.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case, having a storage compartment, for an electronic device, comprising:
   a soft protective case which comprises a back panel to cover a back portion of the electronic device, a raised wall formed on a bottom surface of the back panel to form the storage compartment, and a side wall extending from a top surface of the back panel along edges of the back panel for significantly covering a side portion of the electronic device;
   a hard protective frame, configured to removably mount over the soft protective case wherein the hard protective frame comprises grooves; and a cover which includes rails adapted to mate with and to be slidably mounted on the grooves so that the cover slides along the grooves to open and close the storage compartment, wherein the soft protective case significantly covers a back portion of the electronic device with the top surface of the back panel and a side portion of the electronic device with the side wall of the soft protective case, wherein the soft protective case is sufficiently flexible to accept insertion of the electronic device therein and sufficiently rigid to securely retain the inserted electronic device.

2. The case of claim 1, wherein the hard protective frame further comprises an aperture snugly fitting with an outer side of the raised wall of the soft protective case.

3. The case of claim 1, wherein the soft protective case is provided with a plurality of indentations formed on the side wall of the soft protective case and the hard protective frame has complementary structures to be received in the indentations.

4. The case of claim 1, wherein the hard protective frame is provided with an indentation structure and the cover is constructed to form a complementary structure to be received in the indentation structure of the hard protective case.

5. The case of claim 4, wherein the hard protective frame has a protuberance on an opposite side of the indentation structure of the hard protective frame to structurally support and reinforce the indentation structure of the hard protective frame, and wherein the soft protective case has a complementary structure of an indentation to receive the protuberance of the hard protective frame.

6. The case of claim 1, wherein the number of the grooves is two and the grooves are formed on opposite side walls of the hard protective frame, and wherein the number of the rails is two and the rails are formed on opposite side walls of the cover.

7. The case of claim 6, wherein the side walls of the hard protective frame and the side walls of the cover are slanted.

8. The case of claim 1, wherein width and length of the storage compartment is respectively slightly greater than those of a credit card.

9. The case of claim 8, wherein elastic tabs are formed on opposite sides of the raised wall of the soft protective case for securely holding the credit card.

10. The case of claim 1, wherein the bottom surface of the soft protective case further comprises a depression for easy access to a credit card stored in the storage compartment.

11. The case of claim 1, wherein the hard protective frame further comprises a locking protrusion and the cover further comprises a locking recess positioned to mate with the corresponding locking protrusion.

12. The case of claim 1, wherein the hard protective frame further comprises a cavity and the cover further comprises a mating protrusion positioned to mate with the cavity of the hard protective frame.

13. The case of claim 1, wherein the soft protective cover is made of thermoplastic polyurethane and the hard protective frame and the cover are made of polycarbonate.

14. The case of claim 1, wherein a longitudinal recess is formed on the bottom surface of the soft protective case along the outer side of the raised wall of the soft protective case, wherein a longitudinal protrusion is formed on the hard protective frame along a boundary of the aperture, and wherein the longitudinal protrusion of the hard protective frame snugly fits into and is received by the longitudinal recess of the soft protective case.

15. The case of claim 1, wherein the soft protective case comprises a long recess and the hard protective frame comprises a long protrusion such that the long recess of the soft protective case receives the long protrusion of the hard protective frame therein.

16. A case, having a storage compartment, for an electronic device, comprising:

a soft protective case which comprises a back panel to cover a back portion of the electronic device, and a side wall extending from a top surface of the back panel along edges of the back panel;

a hard protective frame, configured to removably mount over the soft protective case, wherein the hard protective frame comprises an aperture to form the storage compartment;

a cover to slide forward and backward with respect to the hard protective frame for opening and closing the storage compartment formed on a bottom surface of the soft protective case; and a sliding means for sliding the cover forward and backward with respect to the hard protective frame.

17. The case of claim 16, wherein the sliding means comprises a pair of grooves formed on the hard protective frame and a pair of rails formed on the cover wherein the rails are configured to mate with and to be slidably mounted on the grooves.

18. The case of claim 16, wherein a raised wall is formed on a bottom surface of the soft protective case to form the storage compartment and the aperture of the hard protective frame surrounds the raised wall of the soft protective case.

19. The case of claim 16, wherein the soft protective case is provided with a plurality of indentations and the hard protective frame has complementary structures to be received in the indentations.

20. The case of claim 19, wherein the hard protective frame is provided with an indentation structure and the cover has a complementary structure received in the indentation structure of the hard protective case, wherein the hard protective frame has a protuberance on an opposite side of the indentation structure of the hard protective frame to structurally support and reinforce the indentation structure of the hard protective frame, and wherein the soft protective case has a complementary structure of an indentation to receive the protuberance of the hard protective frame.

21. The case of claim 16, wherein the case further comprises a standing leg which fits in an opening formed on a back portion of the hard protective frame wherein the standing leg is pivoted with the opening.

22. The case of claim 16, wherein the soft protective case comprises a long recess and the hard protective frame comprises a long protrusion such that the long recess of the soft protective case receives the long protrusion of the hard protective frame therein.

* * * * *